Patented Sept. 20, 1932

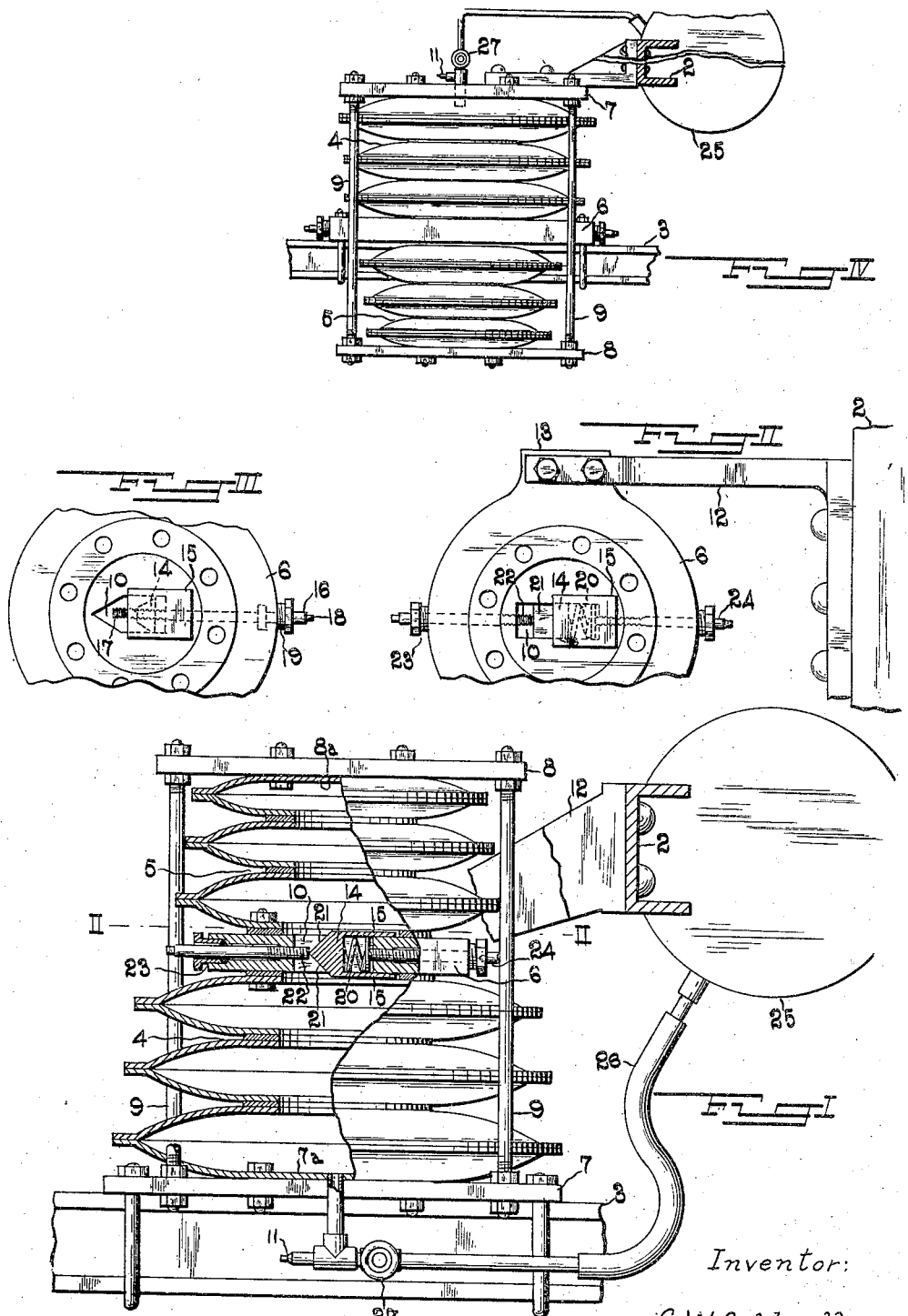

1,878,756

UNITED STATES PATENT OFFICE

CHARLES WILLIAM CALDWELL, OF JOHANNESBURG, TRANSVAAL, UNION OF SOUTH AFRICA

PNEUMATIC SPRING SUITABLE FOR VEHICLES

Application filed July 12, 1928. Serial No. 292,130.

The present invention relates to pneumatic spring devices suitable for the suspension of motor car bodies, cycle saddles, cycle frames and for similar uses. The object of the invention is to provide a spring which offers resistance commensurate with the intensity of the shocks imposed upon it and which checks the rebound movement.

The invention is illustrated in the accompanying drawing in which

Fig. I is a vertical section of one form of the invention.

Fig. II is a sectional view of Fig. I on II—II Fig. I, showing a valve.

Fig. III shows another form of valve.

Fig. IV shows another form of spring to a smaller scale.

2 indicates the body of a vehicle and 3 the axle from which the body is supported by means of the pneumatic spring.

The spring comprises two bellows 4, 5, so connected together that when either is compressed the other is expanded. For this purpose they are shown secured to opposite faces of a common intermediate plate 6 and having their end plates 7, 8 rigidly connected by bolts 9. The interior spaces of the two bellows are put in communication with one another by, for instance, an aperture 10 in the intermediate plate 6. The bellows are charged with compressed air through a valve 11, so that both resist compression. The area of the end 7a of the bellows 4 is greater than that of the end 8a of the bellows 5, so that the bellows 4 offers a greater resistance to compression than the other bellows 5; and said bellows 4 is arranged to sustain the weight of the body. For this purpose in the Fig. I arrangement, the body 2 is mounted by brackets 12 engaging lugs 13 on said plate 6; and the lower end plate 7 is supported by the axle 3. Fig. IV reverses this arrangement; the plate 6 being supported on the axle 3 with the bellows 4 positioned above the bellows 5; and the body 2 secured to the end plate 7.

Upward movement of the axle 3 relatively to the body 2 causes air to be displaced from the bellows 4 into the bellows 5, and the volume occupied by the air being thereby decreased, its resistance to the displacement increases, whereby the movement is stopped and the parts are restored to their original position as in an ordinary spring.

The area of the aperture 10 is so limited that it exerts a substantial throttling effect on the air passing through it, thus adding frictional resistance to the resistance due to the compression of the air. During the return movement of the spring, air is displaced from the bellows 5 into the bellows 4. The throttling which then takes place in the aperture 10 resists the return movement; slowing it down and minimizing the unpleasant rebound of the body beyond its normal position relatively to the axle.

14 represents a valve for regulating the area of the aperture 10 and therefore its throttling effect. The aperture is in the form of a slot; the valve comprising a block sliding in the slot and having upper and lower flanges 15 which extend beyond the block at the sides and end for covering the aperture 10. The valve is adjusted to cover more or less of the aperture 10; and in the Fig. III form this is done by means of a rotatable spindle 16 extending through the plate 6 and having a threaded end 17 screwed into the block 14. The external end 18 of the spindle is squared to receive a wrench; and a stuffing box 19 is provided to prevent the escape of air.

In the construction of Figs. I and II the valve opening is arranged to vary automatically according to the rate of flow of air past it. The valve is provided with a spring 20 tending to move it to close the aperture 10. The end of the valve which limits the aperture 10 is bevelled to provide the surfaces 21 inclined away from the aperture. Air flowing through the aperture impinges on one of the inclined surfaces and forces the valve open to an extent varying with the velocity of the flow. 22 is a set screw for limiting the closing movement of the valve, screwed through the plate 6 and fitted with a stuffing box 23. 24 is a similarly arranged screw which bears against the back of the spring 20. By retracting this screw the pressure of the spring on the valve is diminished and the valve is allowed to open more for a given velocity of flow through the aperture 10.

25 indicates an air storage reservoir with which the bellows may be put into communication by means of a pipe 26 controlled by a valve 27. Said reservoir has the effect of increasing the volumetric capacity of the bellows and so decreasing the ratio of resistance to compressive movement.

It is preferred to make the bellows of varying cross sectional area as shown. The smaller sections are compressed by lower pressures than the larger sections, thus enabling the springs to yield readily to small shocks whilst also being capable of resisting heavier shocks without excessive deformation.

I claim.

1. A spring device suitable for vehicle suspension comprising an intermediate plate, two pneumatic springs arranged at opposite sides of said plate, said plate being perforated to put the springs in throttled communication with one another, the outer ends of the springs being rigidly connected to one another, the intermediate plate and the outer end assembly forming the mechanical ends of the spring, one of said springs offering a greater resistance than the other and forming the weight sustaining member of the combination.

2. A pneumatic device comprising two pneumatic springs requiring different forces to compress them equally and connected by means providing for the compression of one spring simultaneously with extension of the other spring, means connecting the air bodies in the springs, a valve controlling the flow from one air body to the other, a spring tending to close said valve, said valve having a surface exposed to air flowing from one air body to the other and so inclined that the reaction of the flowing air on said surface tends to open the valve.

3. A pneumatic device comprising two pneumatic springs requiring different forces to compress them equally and connected by means providing for the compression of one spring simultaneously with extension of the other spring, means connecting the air bodies in the springs, a valve controlling the flow from one air body to the other, a spring tending to close said valve, said valve having a surface exposed to air flowing from one air body to the other and so inclined that the reaction of the flowing air on said surface tends to open the valve, and means to adjust the ratio of the forces exerted on the valve respectively by the spring and the flowing air.

4. A pneumatic device comprising two pneumatic springs requiring different forces to compress them equally and connected by means providing for the compression of one spring simultaneously with extension of the other spring, means connecting the air bodies in the springs, a valve controlling the flow from one air body to the other, a spring tending to close said valve, said valve having a surface exposed to air flowing from one air body to the other and so inclined that the reaction of the flowing air on said surface tends to open the valve, and an adjustable stop to regulate the closing movement of the valve.

5. A spring device suitable for vehicle suspension comprising an intermediate plate, two pneumatic springs arranged at opposite sides of said plate, said plate being perforated to put the springs in communication with one another, the outer end of the springs being rigidly connected to one another, the intermediate plate and the outer end assembly forming the mechanical ends of the spring, one of said springs offering a greater resistance than the other and forming the weight sustaining member of the combination.

6. A spring device suitable for vehicle suspension comprising an intermediate plate, two bellows springs arranged at opposite sides of said plate and with their air bodies in permanent communication with one another, each bellows comprising an end plate and said end plates being rigidly secured to one another, the end plate assembly and the intermediate plate forming the mechanical ends of the spring.

7. A spring device suitable for vehicle suspension comprising an intermediate rigid structure, two bellows springs secured to the opposite sides of said intermediate structure, each of said springs comprising a plurality of bellows units which differ successively from one another in diameter so that each spring is of tapering form lengthwise, the outer ends of the springs being rigidly connected to one another, the intermediate structure and the outer end assembly forming the mechanical ends of the spring, one of said springs offering a greater resistance to compression than the other, and means placing the air bodies of said springs in communication with one another.

8. A spring device suitable for vehicle suspension comprising an intermediate rigid structure, two bellows springs secured to the opposite sides of said intermediate structure, each of said springs comprising a plurality of bellows units which differ successively from one another in diameter so that each spring is of tapering form lengthwise, the outer ends of the springs being rigidly connected to one another, the intermediate rigid structure and the outer end assembly forming the mechanical ends of the spring, one of said springs offering a greater resistance to compression than the other, and means placing the air bodies of said springs in throttled communication with one another.

In testimony whereof I affix my signature.

CHARLES WILLIAM CALDWELL.